United States Patent
Mätze et al.

(10) Patent No.: US 11,759,981 B2
(45) Date of Patent: Sep. 19, 2023

(54) VENTILATION MODULE AND ASSOCIATED STRETCHING SYSTEM

(71) Applicant: BRÜCKNER MASCHINENBAU GmbH, Siegsdorf (DE)

(72) Inventors: Michael Mätze, Teisendorf (DE); Christoph Höglauer, Waging am See (DE)

(73) Assignee: BRÜCKNER MASCHINENBAU GmbH, Siegsdorf (DE)

( * ) Notice: Subject to any disclaimer, the term of this patent is extended or adjusted under 35 U.S.C. 154(b) by 295 days.

(21) Appl. No.: 16/945,023

(22) Filed: Jul. 31, 2020

(65) Prior Publication Data

US 2021/0031411 A1 Feb. 4, 2021

(30) Foreign Application Priority Data

Aug. 1, 2019 (DE) .................. 10 2019 120 794

(51) Int. Cl.
| | |
|---|---|
| *B29C 35/00* | (2006.01) |
| *B29C 55/20* | (2006.01) |
| *B29C 35/04* | (2006.01) |
| *B29C 35/16* | (2006.01) |
| *B29L 7/00* | (2006.01) |

(52) U.S. Cl.
CPC .......... *B29C 35/002* (2013.01); *B29C 35/045* (2013.01); *B29C 35/16* (2013.01); *B29C 55/20* (2013.01); *B29C 2035/046* (2013.01); *B29C 2035/1666* (2013.01); *B29L 2007/008* (2013.01)

(58) Field of Classification Search
CPC ............ B29C 35/002; B29C 2035/046; B29C 2035/1666; B29C 55/20; B29C 55/12; B29C 55/02

See application file for complete search history.

(56) References Cited

U.S. PATENT DOCUMENTS

| | | | | |
|---|---|---|---|---|
| 5,791,031 | A * | 8/1998 | Steffi | B29C 55/20 26/72 |
| 2014/0013612 | A1* | 1/2014 | Lee | B29C 55/08 264/165 |
| 2020/0108547 | A1* | 4/2020 | Abe | B29C 35/045 |

FOREIGN PATENT DOCUMENTS

| | | |
|---|---|---|
| CN | 102712133 | 10/2012 |
| CN | 103442879 | 12/2013 |
| CN | 203718818 | 7/2014 |
| CN | 107801356 | 3/2018 |

(Continued)

OTHER PUBLICATIONS

Extended European Search Report issued in EP App. No. 20183468.6 (dated Mar. 12, 2021).

(Continued)

*Primary Examiner* — Kelly M Gambetta
*Assistant Examiner* — Virak Nguon
(74) *Attorney, Agent, or Firm* — Nixon & Vanderhye P.C.

(57) ABSTRACT

A ventilation module is disclosed having a ventilation outlet channel including a gas flow inlet side and an opposite gas flow outlet side. The ventilation outlet channel is separated in the longitudinal direction to form at least two ventilation channel portions, such that the at least two ventilation channel portions are adjustable away from and towards one another transversely to the longitudinal extent of the ventilation outlet channel. The width of the ventilation outlet channel and thus the flow cross section can be increased or decreased.

12 Claims, 12 Drawing Sheets

(56) References Cited

FOREIGN PATENT DOCUMENTS

Figure 1:
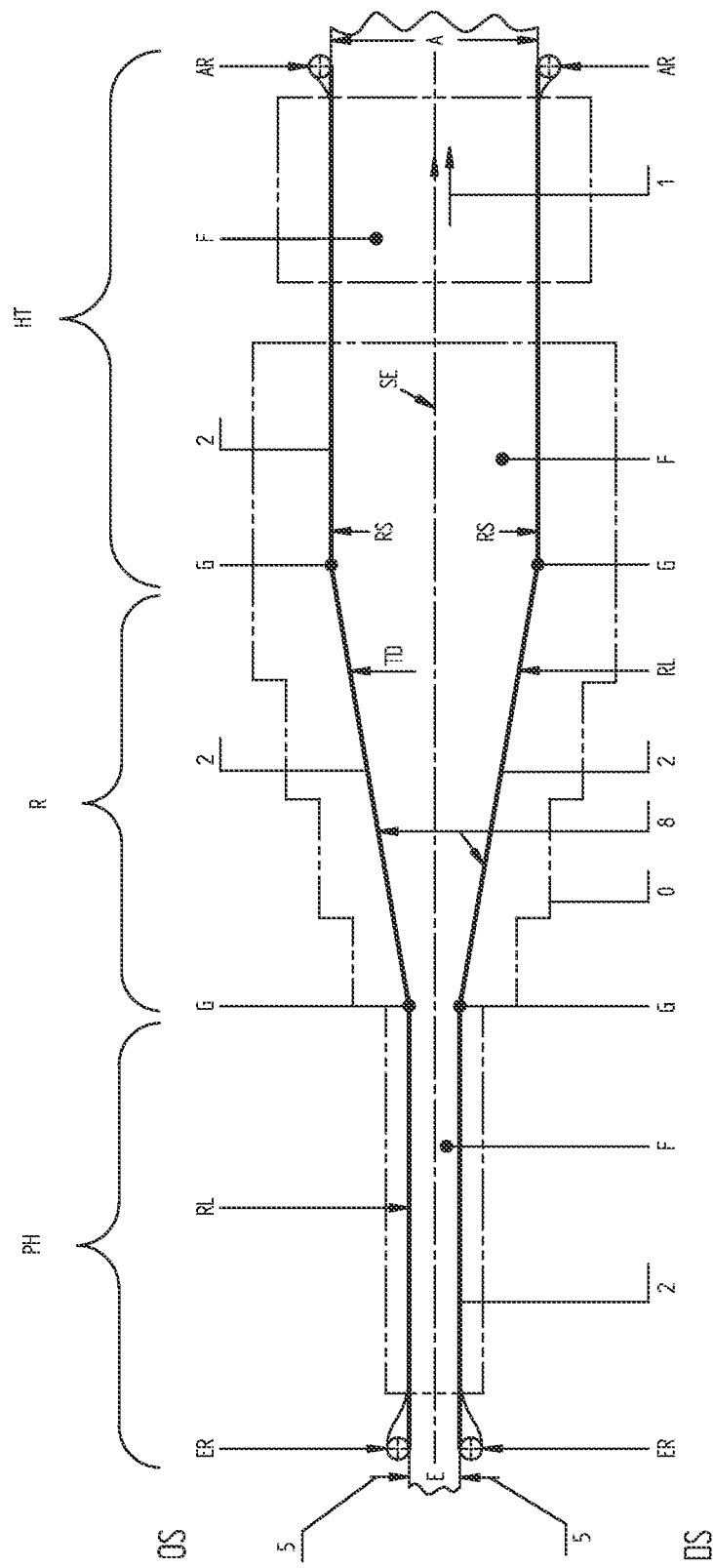

| | | |
|---|---|---|
| DE | 927 682 | 5/1955 |
| DE | 196 23 471 | 2/1998 |
| EP | 2 692 508 | 2/2014 |
| JP | H04208432 | 7/1992 |
| JP | 2007-320276 | 12/2007 |
| JP | 2012211731 A * | 11/2012 |

OTHER PUBLICATIONS

Notification of the First Office Action for Chinese Application No. 202010744853.1, nine pages, dated Feb. 21, 2022.

* cited by examiner

VENTILATION MODULE AND ASSOCIATED STRETCHING SYSTEM

This application claims priority to DE Patent Application No. 10 2019 120 794.0 filed 1 Aug. 2019, the entire contents of which is hereby incorporated by reference.

The invention relates to a ventilation module in particular for stretching systems for plastics films according to the preamble of claim 1 and to a stretching system having such a ventilation module.

Ventilation modules are used inter alia in the manufacture of plastics films. They are used for heating or cooling sheet materials, in particular a plastics film to be stretched. The ventilation nozzle is often arranged transversely, i.e. generally perpendicular to the outflow direction of the material web and thus runs transversely to the longitudinal direction of the material web above and/or below the material web. If such ventilation nozzles are used in film stretching systems, the film stretching system can be a monoaxial longitudinal, a monoaxial transverse or a sequential or simultaneous longitudinal and transverse stretching system.

The uniformity of the outflow and the uniformity of the temperature distribution of the outflowing air flow is particularly important for the film stretching process, since uneven heating of a plastics film during processing can have negative effects on the thickness profile and the structure of the plastics film and thus on its quality. Small hot regions, for example, are stretched more, which can make them thinner than, for example, colder plastics film regions. Uniform ventilation is particularly important in the production of very thin plastics films and foils.

In principle, the aim is to bring the ventilation nozzles as close as possible to the plastics film web so that the heat transfer is as good as possible. In practice, however, the possibility is limited by the transport system, because the clips, which are usually guided on two closed circumferential paths, have a certain overall height and are also generally routed in so-called transport system channels, over which they project via a film-side, slot-side opening and hold the edge of the plastics film to be stretched and transported in the pulling direction.

Different ventilation modules are known from the prior art. Such ventilation modules are often also referred to as ventilation nozzles. DE 196 23 471 C1 discloses a ventilation nozzle which is constructed in the form of a perforated nozzle. A large number of holes arranged in a row, which are offset both in the pulling direction and transversely to the pulling direction, is penetrated by an air volume, which is fed to the plastics film web via a multi-chamber system.

This allows very even air discharge speeds to be achieved over the entire working width of the moving material web. As a result, the heat transfer over the working width is very constant. The air outlet temperature at the nozzle box itself can also be kept very constant over the working width. Return suction is usually done between the individual nozzle boxes. However, due to the large distances between the nozzles and the plastics film plane, very uneven air flows can occur, especially in the region of the film plane, which causes a very uneven temperature distribution. In addition, there may be disturbances in the temperature distribution at the edges of the film, i.e. in particular at the edges of the plastics film, since the cold clips holding the edges of the film cool the ambient air in the region of the edges. Especially with narrow working widths of the plastics film, this leads to a very uneven temperature distribution of the air in the region of the film plane.

These partially disadvantageous conditions have been improved by using nozzle boxes above and below the moving material web, in particular in the form of a plastics film, which include telescopic nozzles and in particular telescopic slot nozzles, by means of which an air flow can be applied to the moving material web. In other words, the slot nozzles can be adjusted to a certain extent in relation to the nozzle body or nozzle channel in the direction of the material plane or away from it.

A further problem that emerged in practice in particular is that the ventilation nozzles and nozzle box attachments currently in use are not suitable for the different working widths that occur in practice.

In practice, plastics films have to be made with different working widths. For this purpose, the distance between the rail systems carrying the clips is adjusted accordingly. As a rule, this adjustment movement cannot be reproduced appropriately by the nozzle box attachments used or the ventilation nozzles. If the working width is required to be more flexible, this means that the nozzle box attachments in the associated ventilation nozzles must be replaced. A flexible working width of, for example, 50 mm to 250 mm or of 250 mm to 1000 mm cannot be achieved with the conventional nozzle box attachments and the associated ventilation nozzles. Nevertheless, in practice, such large different adjustment ranges have to be set again and again, with all the disadvantages described above.

It is therefore an object of the present invention to provide an improved ventilation module with associated nozzles, which eliminates the disadvantages of the prior art and, in particular, also allows larger adjustment ranges with regard to the material webs of different widths required. "Material web width" is ultimately understood to mean the working width or also the film width. The corresponding terms are sometimes used in parallel. The improved ventilation module should also allow an improved temperature distribution in the plane of the material web.

The invention is achieved with respect to the ventilation nozzle according to the invention in accordance with the features specified in claim 1 and with respect to a plastics film stretching system in accordance with the features specified in claim 15. Advantageous embodiments of the invention are specified in the dependent claims.

A number of surprising advantages are realised in the context of the solution according to the invention.

For example, the nozzle according to the invention can extend over a complete ventilation zone without the need to provide intermediate nozzle regions in which it is necessary to suction back.

The nozzle itself is located somewhat further above the transport system carrying the movable clips or the housing of a transport system channel. The nozzle outlet openings are closed in the region above the material web to be processed without gaps in the direction of movement of the material web.

The air or gas suction openings are located in the region between the clips that engage on the side of the material web. At least one nozzle suction opening can be so close to the moving material web and in particular to the moving plastics film web that the distance of the actual nozzle suction opening to the material web is smaller than the distance from a most distant point of a clip or a clip part, for example in the form of a clip lever, to the plane of the material web. This makes it possible for the gas or air stream supplied to the material web to be discharged directly in the desired and set temperature range of the material web to be heated or cooled, without there being any distortion of the temperature by the cooling clips themselves or by undesirable turbulence, which can lead to large undesirable temperature differences.

Above all, however, it is possible within the scope of the invention to maintain these advantages according to the invention regardless of the width of the material web. In other words, the ventilation module according to the invention with the associated nozzle can easily be adjusted in width in other regions without having to give up the advantages according to the invention.

Regardless of the setting in the width direction of the nozzle according to the invention, it is possible for the blown-out air to be suctioned back in a targeted manner between the clips and not in the general space above the material web, in which fresh heated or cooled air is also fed in the direction of the material web. This automatically prevents a temperature exchange between the air flowing around the film and the colder clips or the adjacent walls.

In summary, it can be stated that the function of a ventilation module and hence the ventilation module according to the invention having slot or perforated nozzles, in particular for an oven with a continuous goods line or material web, is to heat and cool the corresponding goods line or material web, in particular in the form of a plastics film to be stretched, and/or to maintain a constant temperature in the region of this goods line or material web, wherein the goods line or material web can vary in thickness. As is generally known, the nozzle outlet direction is directed perpendicularly or obliquely to the goods line or material web, wherein the ventilation nozzles are arranged above and/or below the goods line or material web.

However, it is now possible within the scope of the invention to achieve the following advantages:

A flexible adjustment of the working width of the ventilation nozzle is possible, for example of 50 mm to 2000 mm (this gives a high degree of flexibility without having to change the working width in case of a modification);

The ventilation nozzle according to the invention allows optimised air flow and isolation of the influence of the cold clips and/or boundary walls;

Within the scope of the invention, an optimised return suction is possible of the gas or air flow to be extracted;

With the ventilation nozzle according to the invention, a very good temperature distribution is achieved in the plane of the material web, for example up to 400° C.; this applies above all also to the edge region (which is particularly important in the case of simultaneous stretching systems, since the edge must also be stretched and, in the prior art, is cooled by the cool clips, which has a very disadvantageous effect on the edge regions, for example of a plastics film to be stretched);

The ventilation module according to the invention allows very good air distribution over the working width;

The ventilation module according to the invention prevents false air flows over the cover of the throughflow holes not required, which cover is provided as part of the solution according to the invention;

There is a reduction in different stretching ratios, for example in the case of a plastics film web to be stretched, especially between the film edge and the film centre, primarily by more uniform temperature control and distribution; and Within the scope of the invention, more uniform material web properties can be achieved over the entire working width, in particular in the case of a plastics film, i.e. in particular with respect to the modulus of elasticity, shrinkage or elongation at break in the case of a plastics film.

Figure 2:
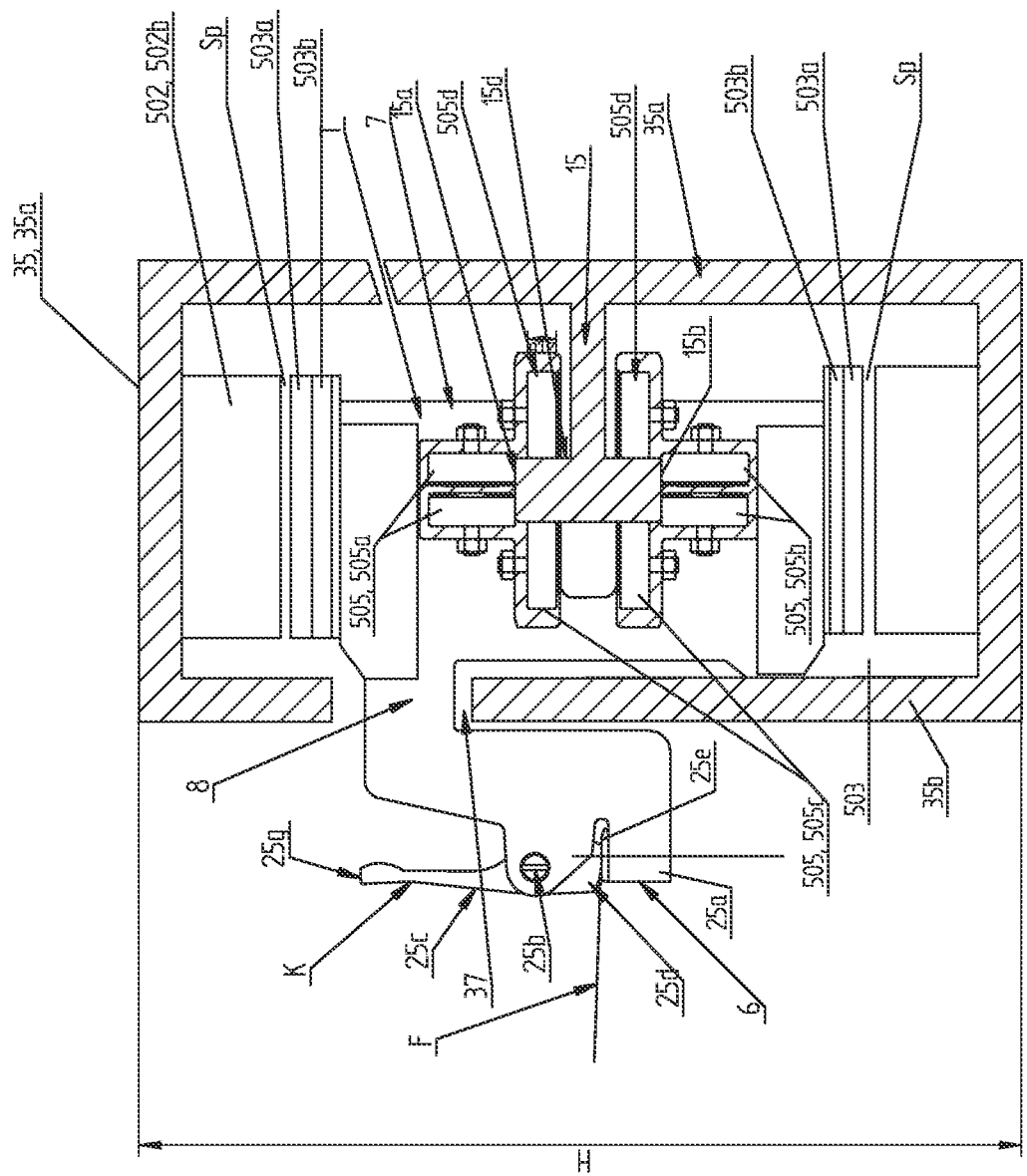
Figure 3:
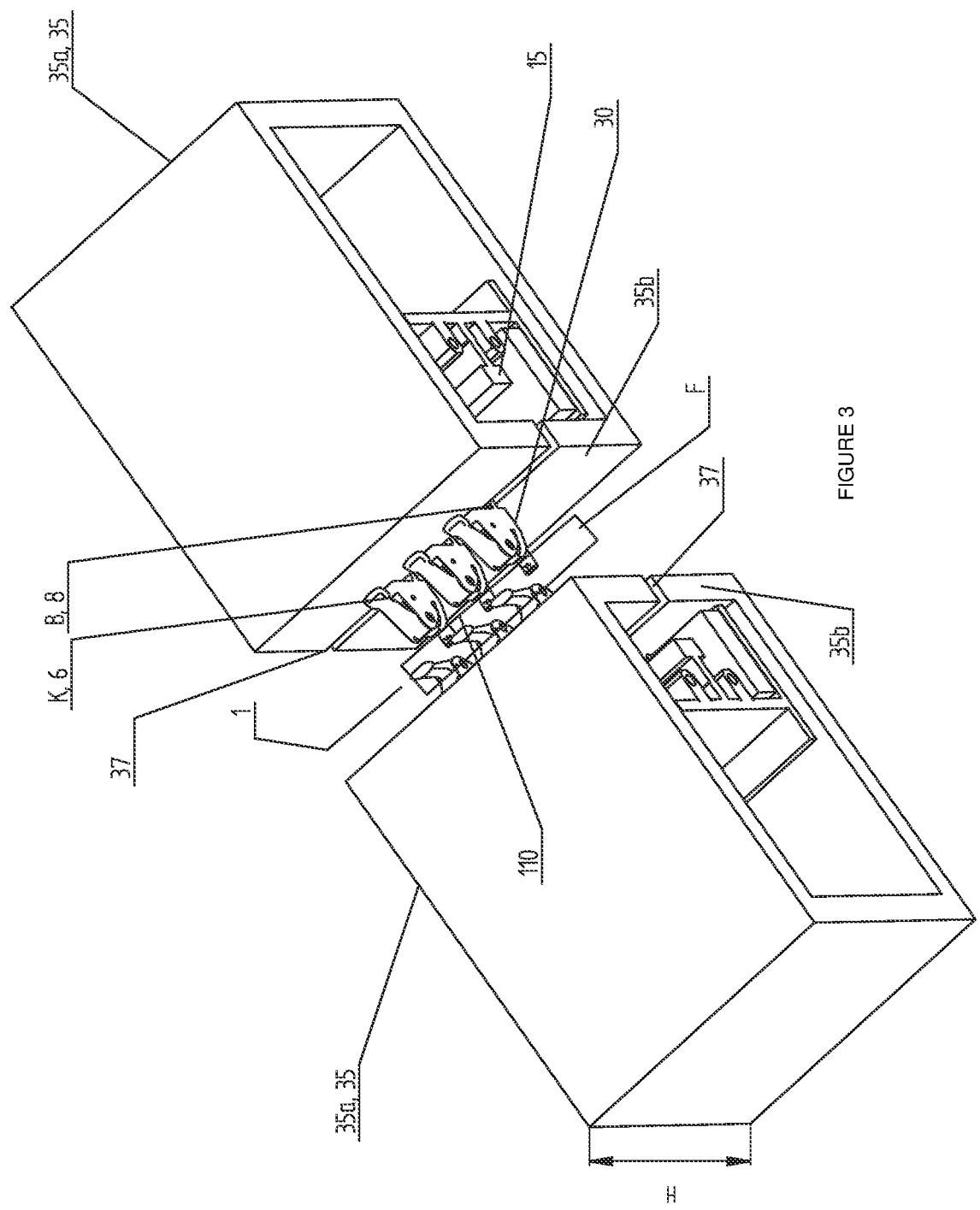
Figure 4:
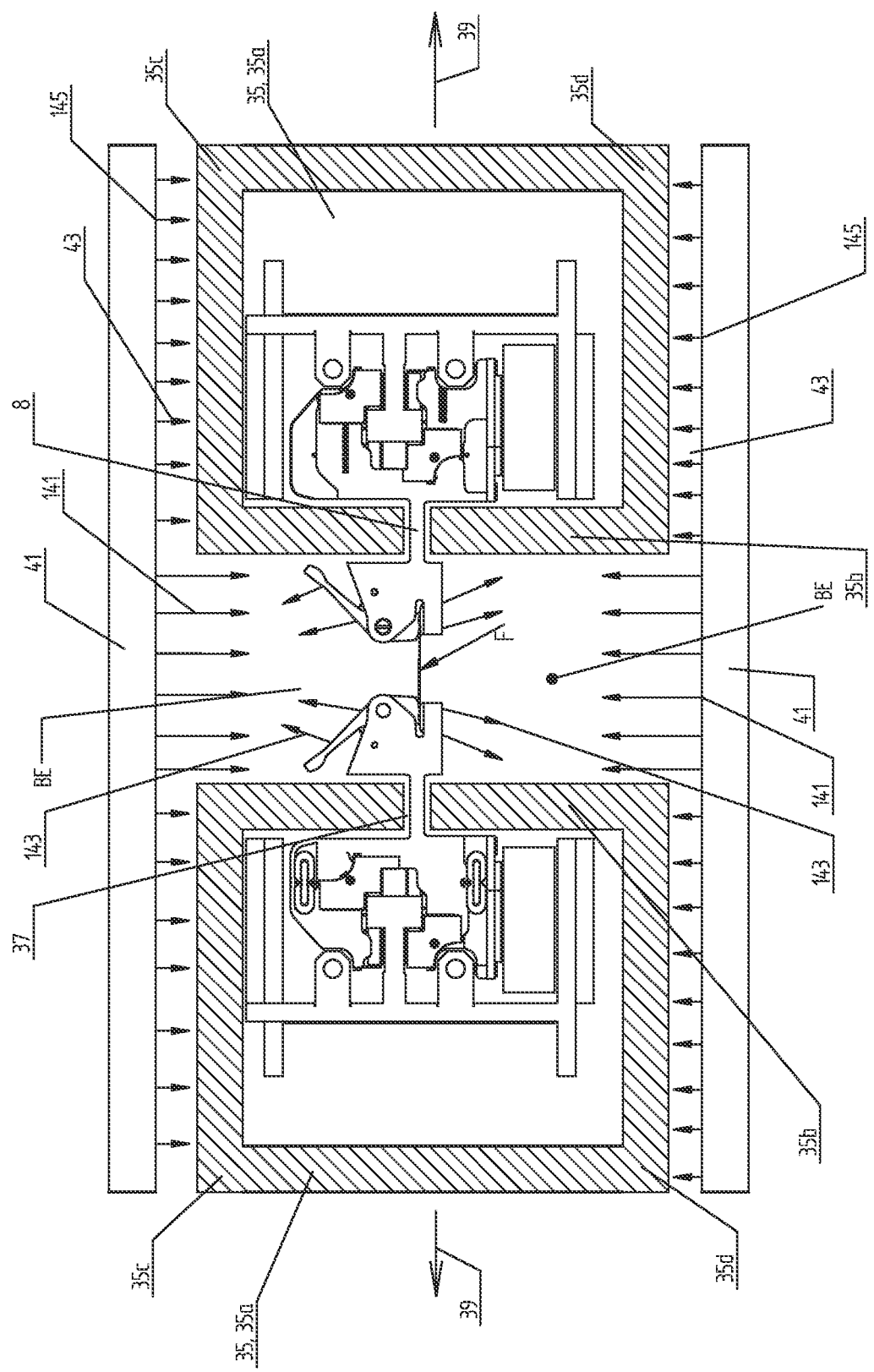
Figure 5A:
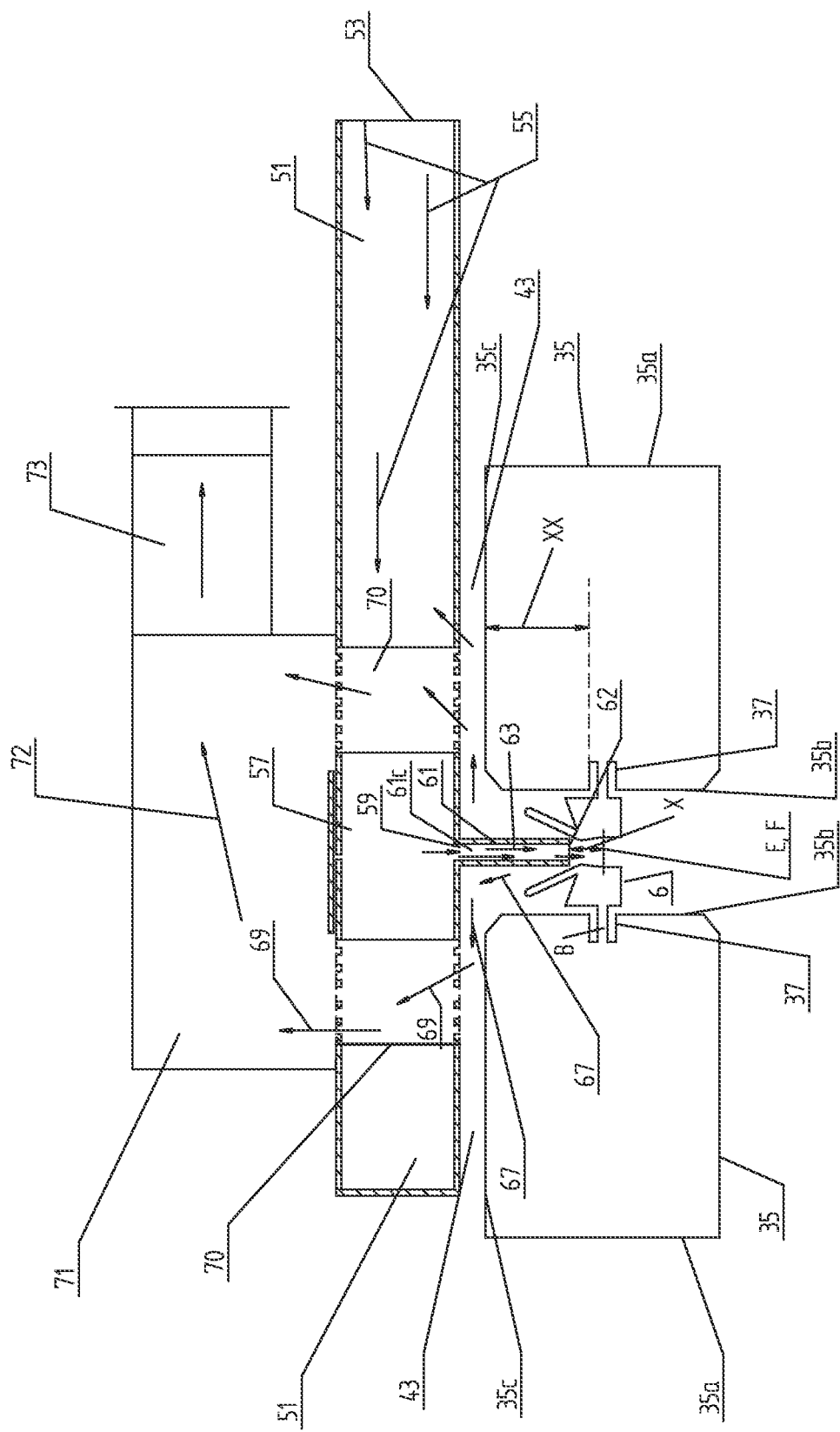
Figure 5B:
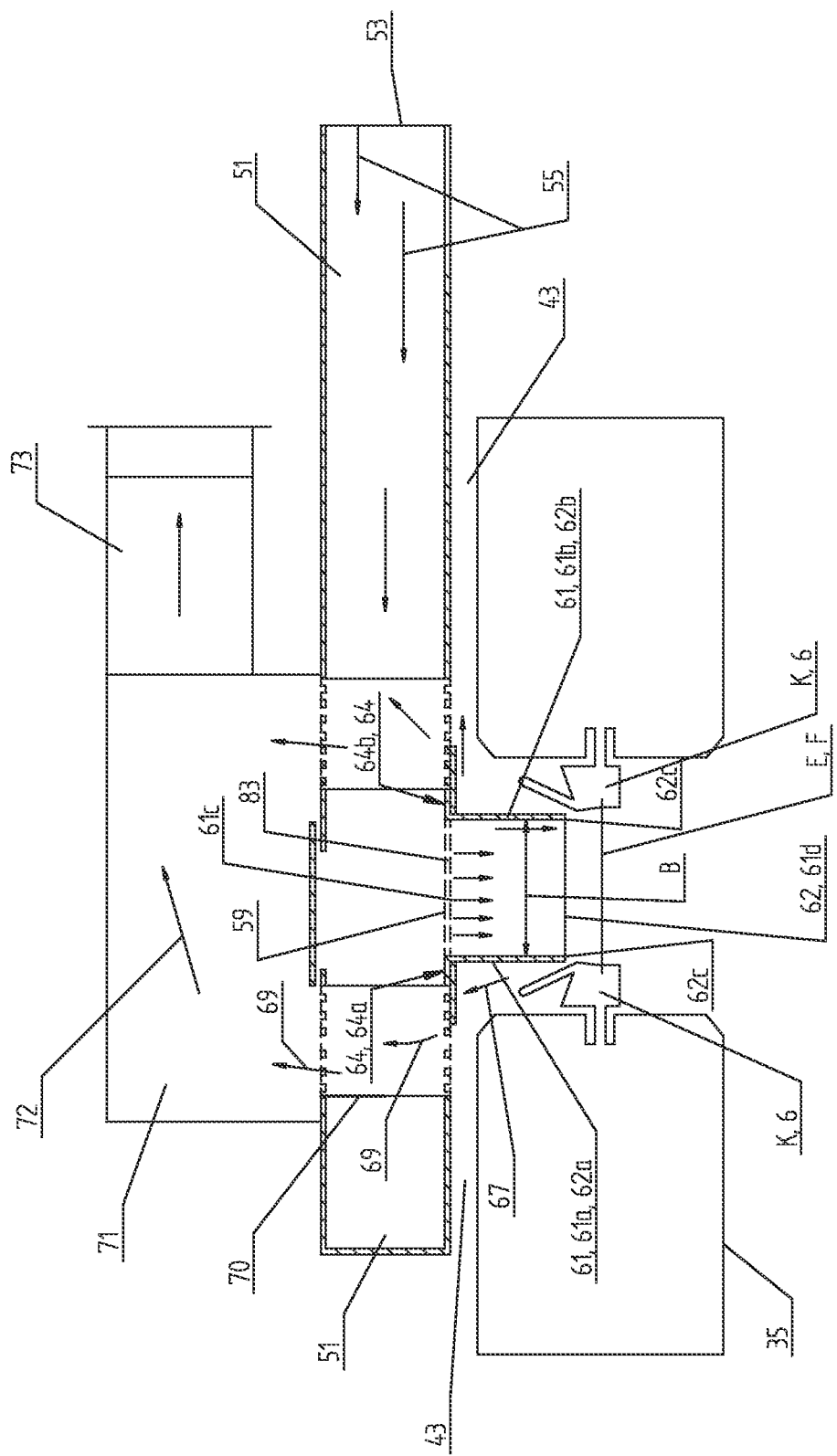
Figure 5C:
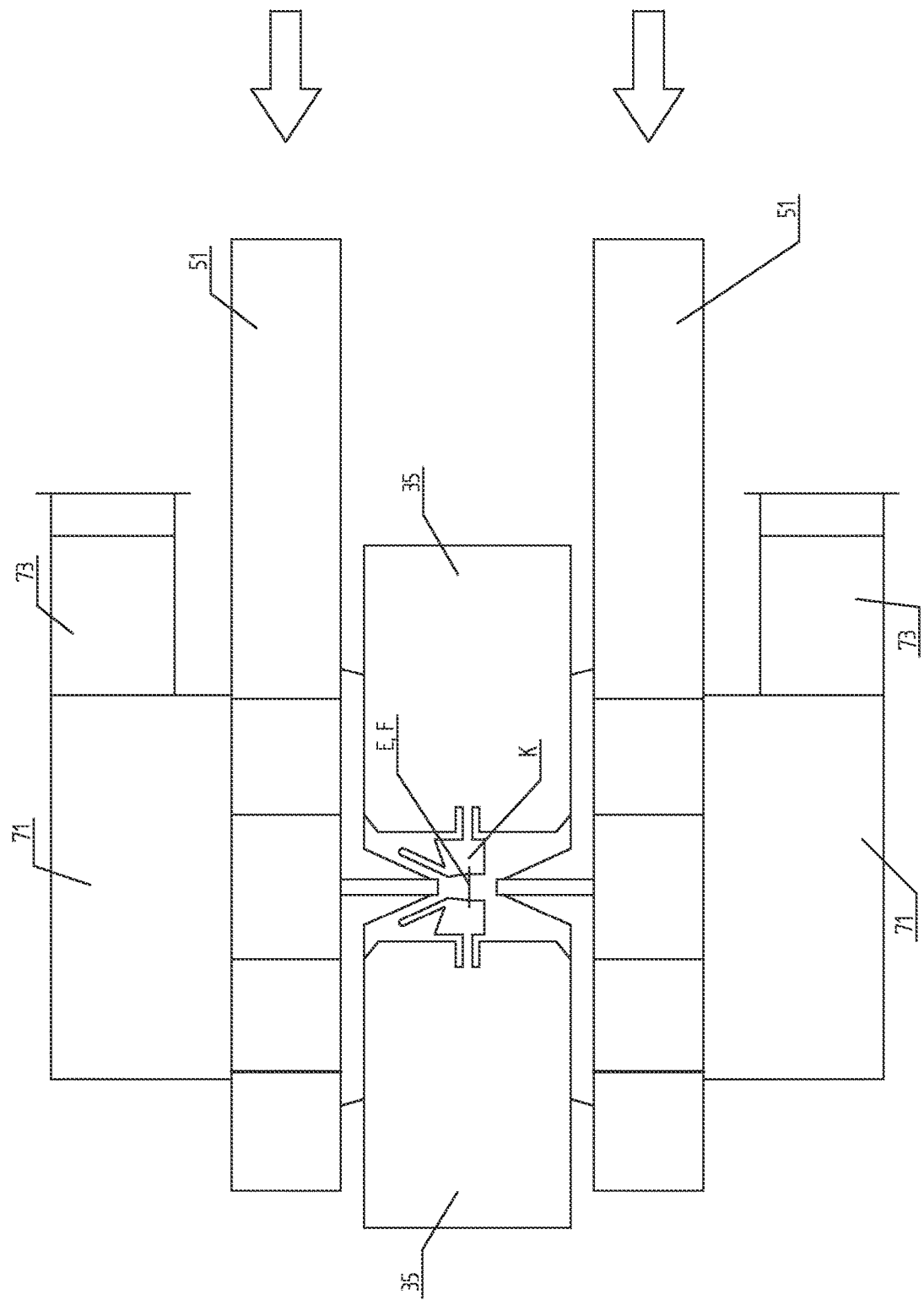
Figure 6A:
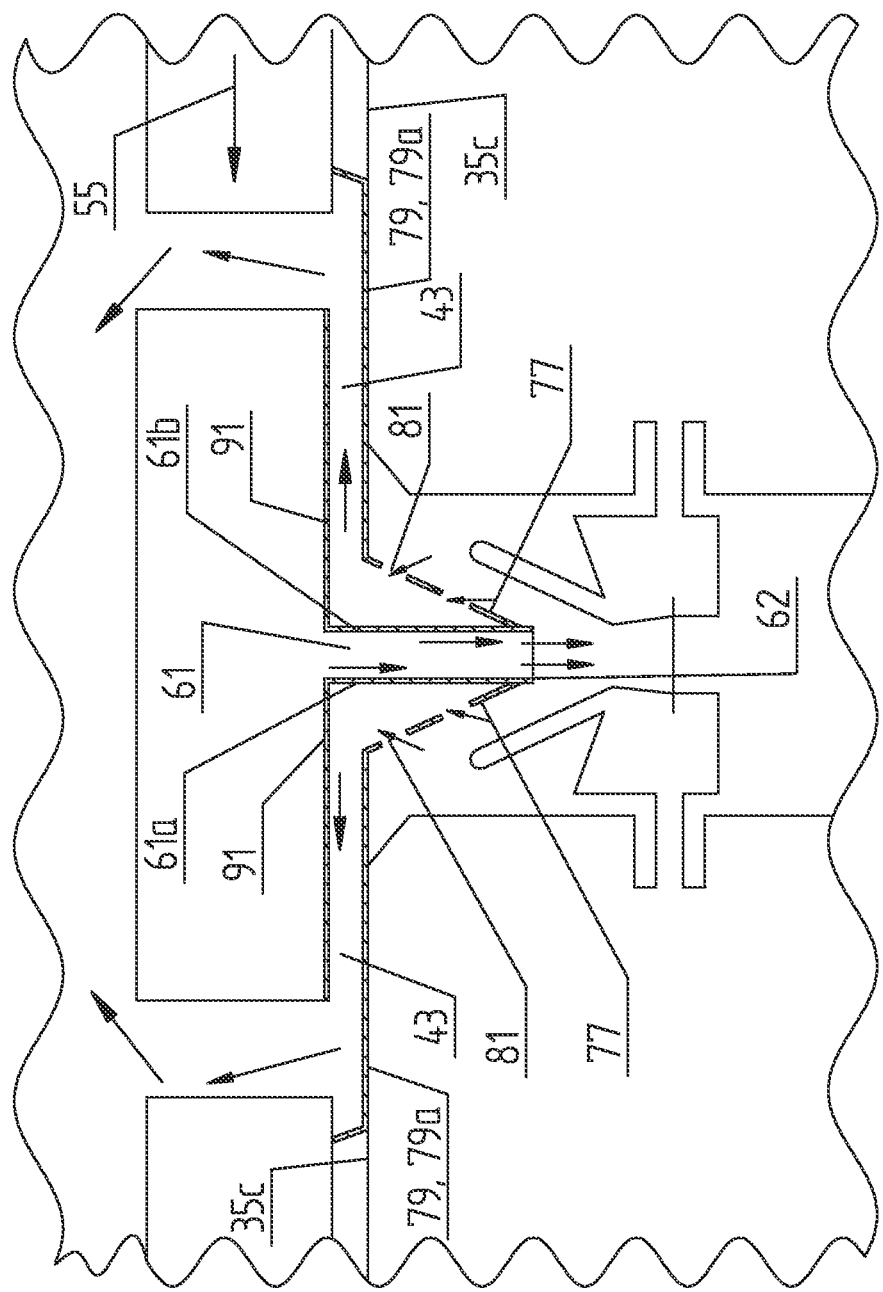
Figure 6B:
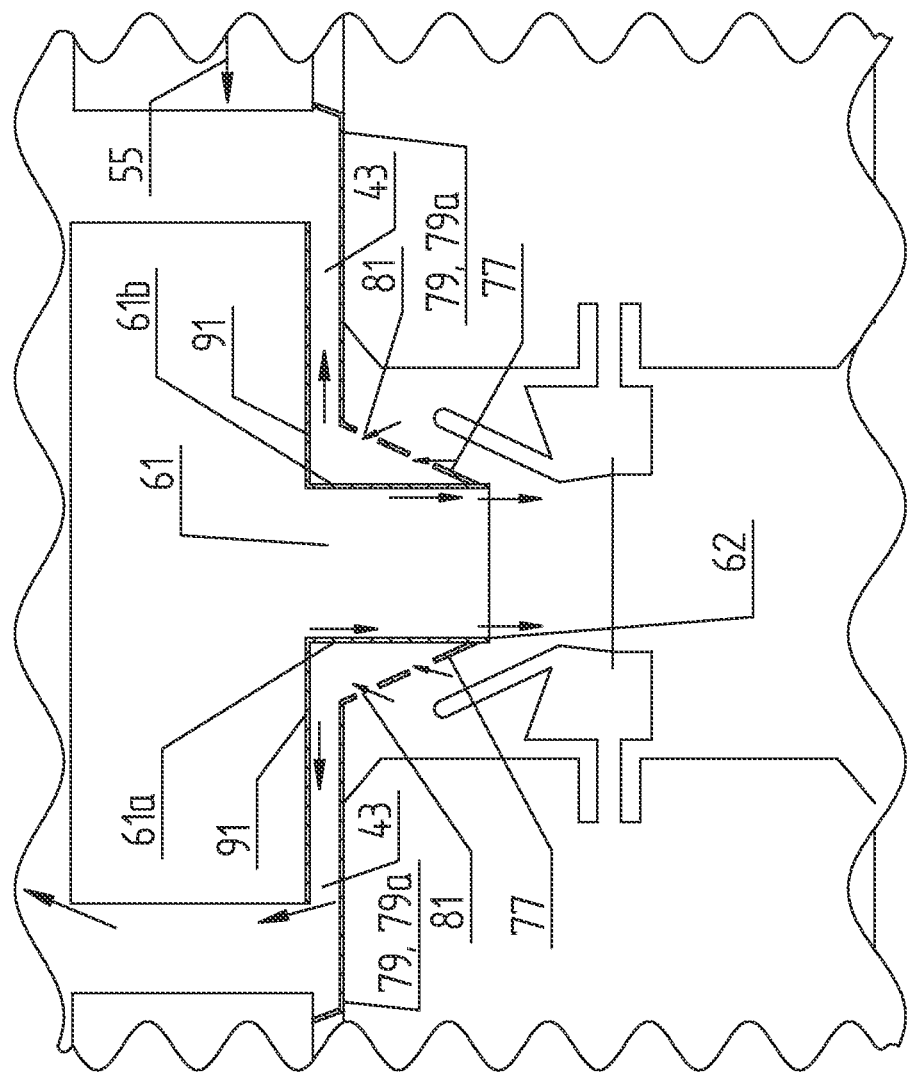
Figure 7:
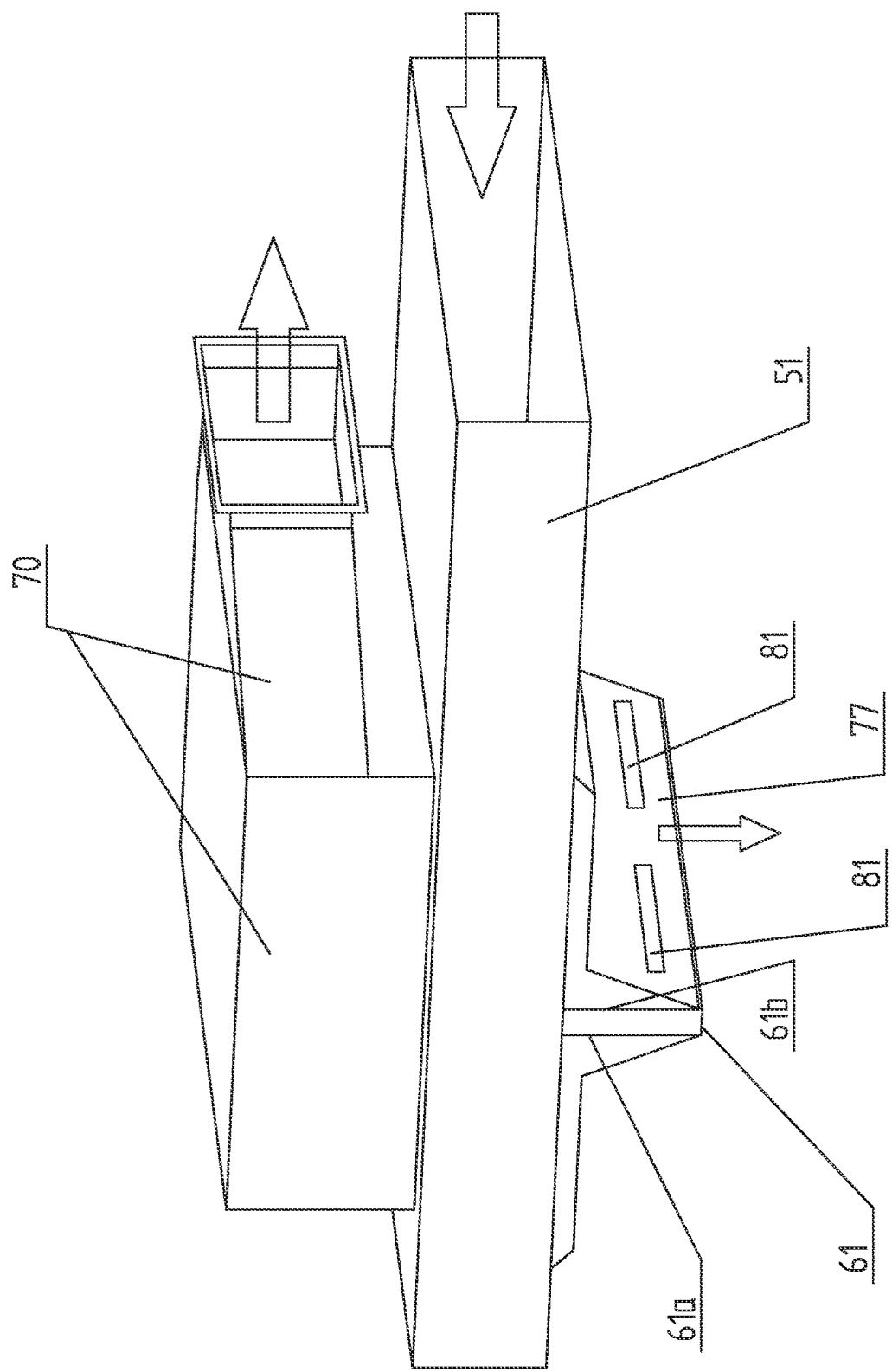
Figure 8A:
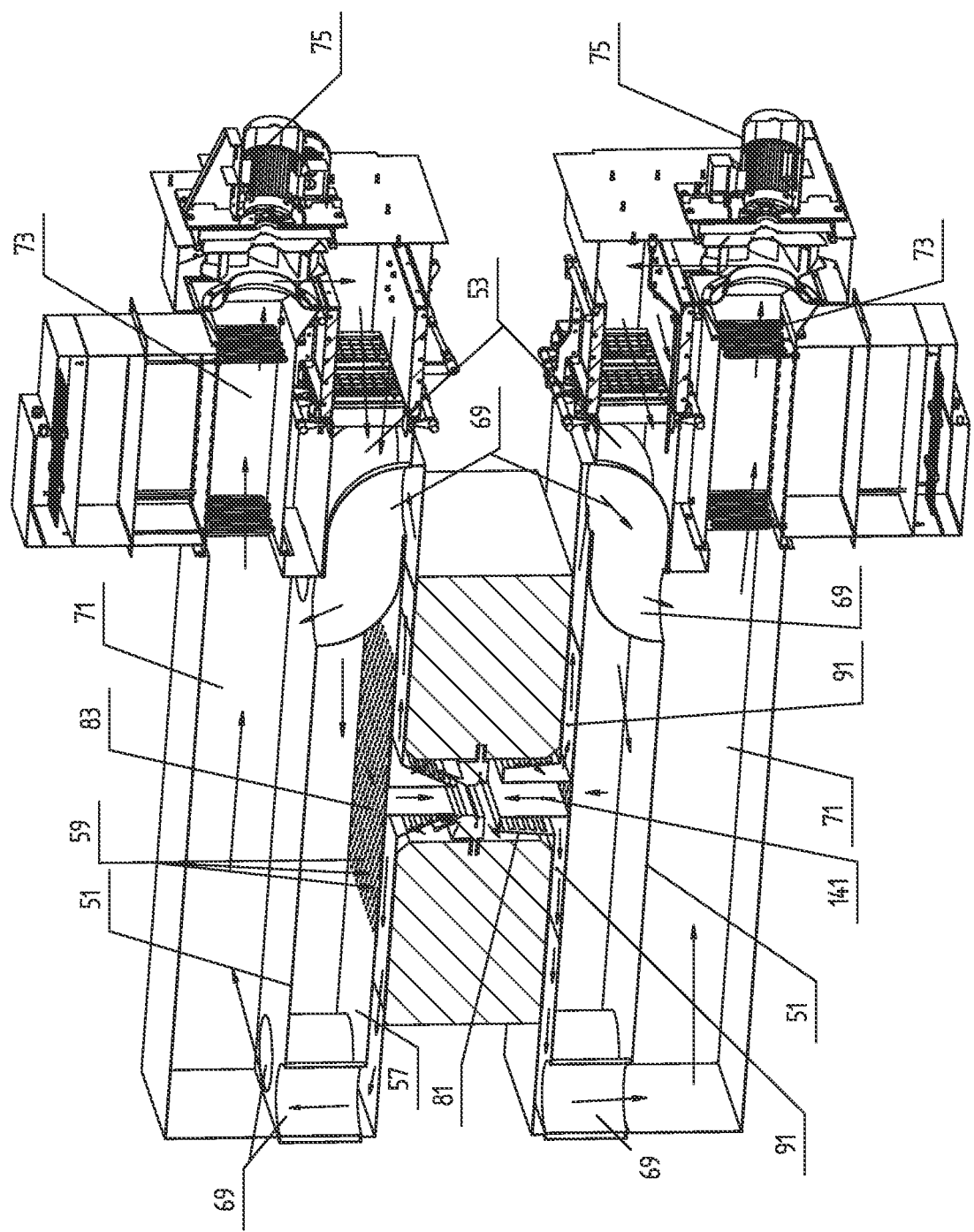
Figure 8B:
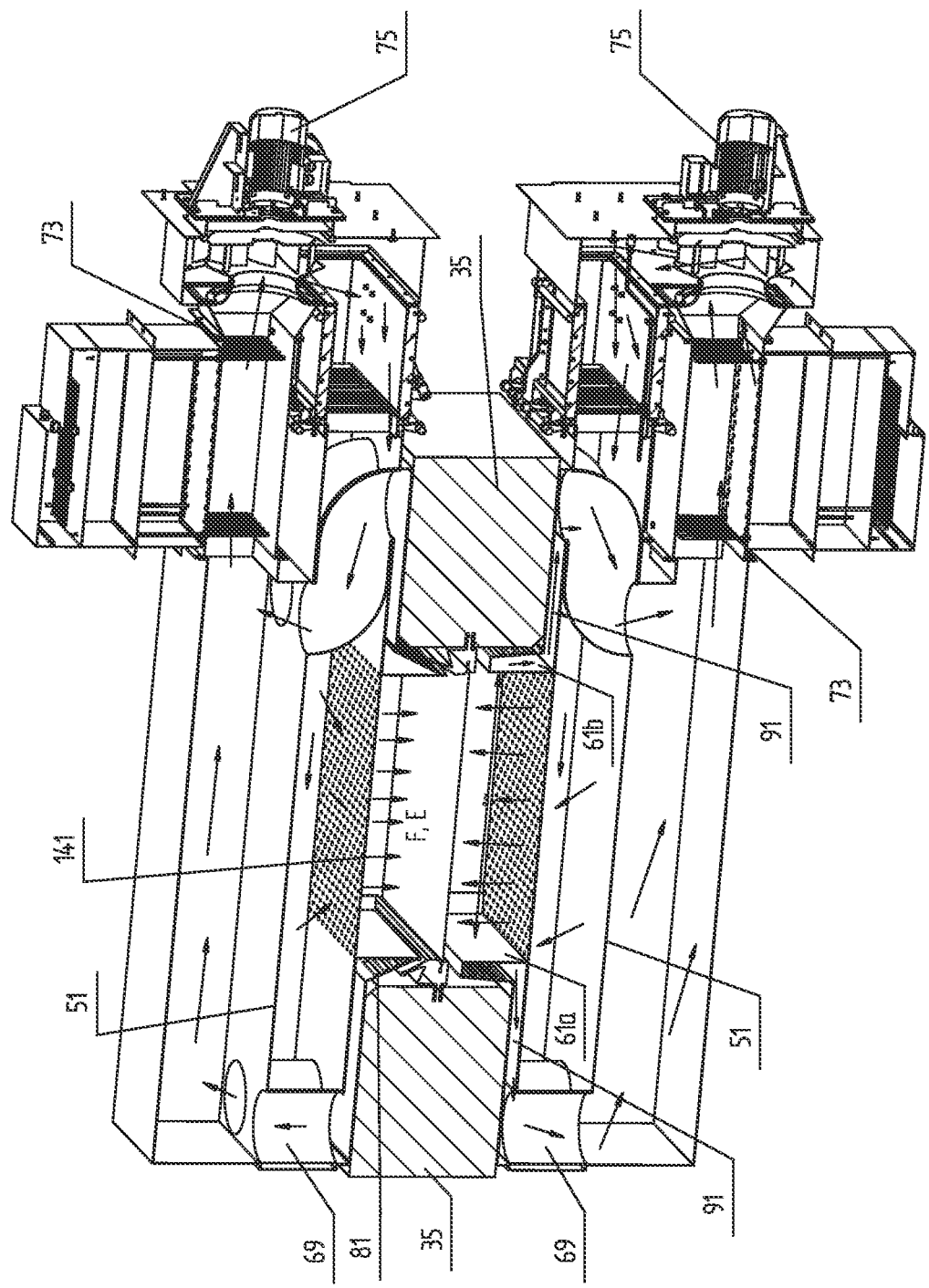

The invention will be explained in more detail hereinafter with reference to embodiments. In detail:

FIG. 1: is a schematic plan view of a stretching system in which a ventilation nozzle according to the invention is used;

FIG. 2: is a cross-sectional view through a possible embodiment of a transport system channel having an internal transport and guide rail and a clip movable thereon with an associated transport part and actual clip part, which projects on the film side over an opening in the transport system channel housing shown in cross section;

FIG. 3: is a schematic spatial view of a section of a stretching system in which the ventilation nozzle is used;

FIG. 4: is a schematic cross-sectional view through a ventilation arrangement known from the prior art;

FIG. 5a: is a schematic cross-sectional view through a ventilation nozzle according to the invention, as it is arranged above a material web level, wherein the system is set with respect to a material web having a small material web width;

FIG. 5b: is a view corresponding to FIG. 5a, in which the entire system including the ventilation nozzle is set with respect to a wide material web;

FIG. 5c: is a schematic, simplified cross-sectional view through the described embodiment reproducing an upper ventilation module to the film or film level and a lower ventilation module;

FIG. 6a: is a schematic cross-sectional view of an embodiment slightly modified compared to FIGS. 5a and 5b if the entire system is set with respect to a small or narrow material web width;

FIG. 6b: a view deviating from FIG. 6a with regard to the embodiment shown in FIG. 6a, but in the case of a setting with respect to a large material web width;

FIG. 7: is a schematic spatial view of a ventilation nozzle described with reference to FIGS. 6a and 6b;

FIG. 8a: is a spatial view of a section of a stretching system with a ventilation nozzle according to the invention shown above the film level and one shown below the film level, if the entire system including the two ventilation nozzles are set to a narrow film web width;

FIG. 8b: is a view corresponding to FIG. 8a, but in which the entire system including the two ventilation nozzles according to the invention is adjusted to a large film web width.

CONSTRUCTION OF A STRETCHING SYSTEM

A ventilation module according to the invention is explained in connection with an exemplary stretching system, wherein the stretching system is primarily explained with the aid of a simultaneous stretching system, although in principle a corresponding ventilation module according to the invention can also be used with other moving material webs in general and with a stretching system in particular, which for example may only consist of a monoaxial longitudinal stretching system, a monoaxial transverse stretching system or a sequential longitudinal and transverse stretching system in which a material web, in particular the plastics film, is first stretched in the longitudinal and then in the transverse direction or vice versa, first in the transverse and then in the longitudinal direction.

A simultaneous stretching system explained by way of example has two symmetrically designed drive systems which are symmetrical about a central plane of symmetry SE running vertically to the film plane. FIG. 1 shows the two drive systems arranged symmetrically to the plane of symmetry SE in the pulling direction 1 with the associated circumferential movement path, wherein between the two drive systems circulating on open tracks or motion tracks 2 the material web F to be treated, i.e. to be stretched, in particular in the form of a plastics film F, moves along the pulling direction 1, for which purpose clips are used which grip the film edge and move the film through the stretching system.

In principle, the plastics melt is dispensed from a nozzle or extruder nozzle, usually onto a cooling roller, which is also referred to as a chill roll. As soon as the film leaves the chill roll, a so-called cast film has formed, which then usually runs into an oven for tempering the film. Thereafter, it is usually no longer referred to as a "cast film" but only as a "film" or "plastics film". At the end of the entire stretching process and generally after a relaxation phase has been carried out, i.e. when the film is completely stretched and comes out of the oven and is wound on a winder, the term "film" is often used.

A film F to be stretched runs in an inlet region ER into the stretching system, wherein the two material web edges or film edges 5 are then gripped by clips K circulating on the closed paths 2, wherein clips are shown in the cross-sectional view with reference to FIG. 2, for example. The clips K thus grip the two material web edges 8 in order to grip and clamp the material web or the film F above it, namely on the so-called operator side (OS) and on the drive side (DS). The film F is then for example heated in a subsequent preheating zone PH and subsequently fed to a stretching zone R in order to be stretched simultaneously in the longitudinal and transverse directions. The clips are accelerated to a higher stretching speed v2 in the infeed region compared to the drive speed v1 in order to stretch the plastics film simultaneously in the longitudinal and transverse directions. The clips are moved away from each other on divergent path portions, wherein the distance x between two successive clips and the distance y between the clips increases, as they are moved on the associated tracks on the drive side on the one hand and on the operator side on the other, i.e. the distance y between the opposite side edges of the plastics film increases. The course of the guide track 2 can be adjusted by means of joints G, especially in the region of the stretching zone, in accordance with the desired and optimal specifications. The guide rails can also pass through an oven O.

The distances x and y are increased in relation to the desired stretching ratios in the longitudinal and transverse directions. At the end of the second step, the film has a speed v2 which is above the speed v1.

Subsequently, in a third step, the stretched film F usually passes through at least one heat treatment zone HT, i.e. a so-called annealing zone, in which relaxation can take place. For this purpose, the speed v2 is slowed down and the distance x between successive clips is reduced. At the same time, the distance y from opposite clips can be reduced. The speeds are reduced to the extent of the desired relaxation.

During the heat treatment, the film is advantageously subjected to relaxation. This relaxation can take place in the longitudinal direction, in the transverse direction or in both directions. It is preferably carried out both in the longitudinal and in the transverse direction. A method is therefore preferred which is characterised in that, after the simultaneous stretching, relaxation is carried out in the longitudinal direction or in the transverse direction or in both directions. This means that the film is allowed to shrink in a controlled manner. The extent of the relaxation is usually between 2% and 12%, preferably between 4% and 8% and most preferably 5% to 7%, in each case of the length and/or the width of the film.

At the exit end AR of the stretching system, i.e. at the end of the so-called exit zone A, the film is unclipped by suitable means and then leaves the simultaneous stretching system.
Construction of a Rail System and the Associated Clips Reference is made below to FIG. 2, in which a cross-sectional view of a linear motor-driven simultaneous stretching system having an associated clip part and transport part is shown by way of example. However, other embodiments are also possible in order to produce the film according to the invention. In this regard, reference is made to other known solutions.

A clip transport unit T can thus be seen in FIG. 2 and comprises a so-called clip part 6 and the so-called transport part 7. The clip part 6 is connected to the transport part 7 via a so-called bridge 8. Depending on the view, the clip bridge 8 can be added to the transport part or to the clip part.

As is usual, the clip part 6 comprises a clip lever 25c which can be pivoted about a clip axis 25b and which is also sometimes referred to as a knife flap 25c. In the case of a film stretching system, a film F is fixed, i.e. clamped and held in place, between the gripping surface 25d and a clip table 25e.

A pear-shaped or U-shaped closing part 25g provides for opening and closing the clip lever and thus for clamping or releasing the film together with a corresponding device according to the prior art (not shown). Depending on the design of the closing part, the opening and closing can be purely mechanical or magnetic.

The actual structure of the linear motor-driven simultaneous stretching system with the corresponding linear motor drive can be taken as known, for example, from EP 0 455 632 B1 or DE 44 36 676 C2, the disclosure of which is referred to in full. The cross-sectional view in FIG. 2 shows the guide and mounting rail 15.

In the embodiment explained, at least one pair of rollers 505, namely an overhead pair of rollers 505a, runs on each running surface, rotates about a horizontal axis and rolls on an upwardly facing running surface 15a. The entire weight of the associated transport part with the associated clip part is absorbed and supported via this pair of rollers.

A pair of rollers 505b rolling on the lower running surface 15b serves only to ensure running safety.

Finally, a pair of rollers 505c and, opposite, a pair of rollers 505d are also provided on the clip side, which rollers roll on the relevant vertical running surfaces 15c and 15d. The transport part 7 is guided and supported thereby. The corresponding guide rail 15 is held at a distance via a plurality of horizontal supports which are offset in the longitudinal direction of the guide rail and which each run in the clearance 401 lying on the side of the clip between the upper and lower running wheels 505d and are firmly connected to the guide rail. However, it is noted that the explanation of the rail arrangement and the rollers running on it is only exemplary. The rail system and support elements of the rollers can also be designed completely differently. Thus, sliding elements could also be used instead of the rollers and, as is known in the prior art, the guide rail itself could also be designed completely differently.

The corresponding transport part is driven by linear motors, which comprise stationary primary parts 502 and secondary parts 503 which are movable with the clip transport parts T. In other words, along the guide rail 15, which also serves as a transport rail 15 at the same time (e.g.

monorail), the clips, i.e. clip 6, are moved longitudinally with the transport parts 7 by means of the primary parts 502 and the secondary parts 503.

The mentioned primary parts 502 are mounted parallel to the guide and support rail 15. The secondary parts 503 consist of the mentioned permanent magnets 503a, which are fastened in a respective holding cage 503b, which in turn is held on the clip body 6.

As can be seen from FIG. 2, a (small) spacing gap Sp is formed between the primary and secondary parts 502, 503, through which the electromagnetic waves generated by the primary part act on the permanent magnets 503a on the transport part and thereby move the transport part in the feed direction.

Deviating from the described rollers, by means of which the clip transport parts T are moved along the travel path, a sliding bearing using suitable sliding elements could in principle also be provided instead of a roller bearing. Combined systems with roller bearings and plain bearings are also possible. Here, too, reference is made to known solutions.

The film is thus stretched, for example, using such a linear motor-driven simultaneous stretching system. Deviating from the linear motor drive that is preferably used, a simultaneous stretching system can also be used that works by means of a pantograph system. In this regard, reference is made to known solutions.

The solution according to the invention is, as mentioned, not only feasible in a simultaneous stretching system, but also in a purely longitudinal or purely transverse stretching system or in a sequential longitudinal and transverse stretching system in which the film is stretched first in the longitudinal and then in the transverse direction or vice versa, first in the transverse direction and then in the longitudinal direction. In this case, FIG. 1 would only show the transverse stretch. For the sake of completeness, it is mentioned that the solution according to the invention is not only possible in a stretching system, but also when, for example, the film is moved in parallel without stretching, in particular is passed in parallel through an oven.

Reference is subsequently made to FIG. 3, which shows in spatial view a section of a corresponding stretching unit, specifically a leading portion in which a plastics film has not yet been stretched in the transverse direction or has not yet been stretched in the transverse direction by means of a simultaneous stretching system or a sequential stretching system. Therefore, the film or plastics film F still has a relatively narrow width.

In the section of the stretching system shown, the two lateral transport system channels 35 are shown, in which the transport parts 7 shown in FIG. 2 can be moved on the corresponding guide and/or support rail 15 and in the construction shown carry the actual clip part 6 via a bridge part B. In this respect, the clip part 6 having the associated transport part will also be referred to below as "movable clips K" for short.

In FIG. 3, the transport system channels 35 are designed in the manner of a housing. For this purpose, the two transport system channel housings 35a are shown in FIG. 3 and are arranged to the left and right of the moving material web F. According to FIG. 3, the transport system channel housings 35a in each case have a top side, a bottom side, remote outer sides and an inner side 35b facing the moving material web F, which in the following is also sometimes referred to as a transport system shielding wall 35b.

The corresponding transport system channels 35 having the associated transport system channel housing 35a can also be seen in the cross-sectional view in FIG. 2, wherein in this embodiment according to FIG. 2 only the guide and transport rails 15 for the forward movement of the clips K in the pulling direction 1 are accommodated in the transport channel housing 35a and the space for the cable ducts and terminal boxes has been omitted for simplification. The rail system for the return path is provided or accommodated in a separate channel outside of this channel housing arrangement 35a.

On the film side, each of the two transport system channels 35 has a column-shaped opening 37, through which the connecting part 8, referred to as bridge B, protrudes and projects between the actual clip part 6 and the transport part 7 in the direction of the film. In FIG. 3, the clips K are shown in the closed state, in which they grip the opposite edges 5 of a film F and are moved or driven in the pulling direction 1 through the system.

Construction of a Conventional Ventilation Module

A conventional ventilation device according to the prior art is shown in cross section in FIG. 4, which in turn shows the two lateral transport system channels 35, which represent the rail system with the transport part 7 and the clip part 6 held via the bridge B which holds a film F clamped between its clip table and the lower end of the clip lever.

The two lateral transport system channels 35 and the ventilation nozzles 41 form the ventilation space BE.

In order to be able to make a different adaptation to different film widths here, the two transport system channels 35 have to be moved further apart, for example in accordance with the arrows 39 shown in the opposite direction. Films can then be processed with a larger film width than shown in FIG. 4, because the clips shown in FIG. 4, which grip the respective lateral film edges, are then further apart from one another and can hold a wider film F clamped in between and move away in the pulling direction 1.

In order to provide a ventilation module here, which allows a different width setting and thus a different setting of the lateral distance between the two lateral transport system channels 35 and the associated movable clips K, a corresponding ventilation nozzle 41 is arranged above the film and a ventilation nozzle 41 below the film, i.e. even above and below the transport system channels 35 and thus above and below the transport system channel housings 35c and 35d.

However, this system has a number of disadvantages, as was explained at the outset. This is because the supply of air, for example, via the ventilation nozzles 41 according to the arrow 141 in the direction of the film F leads to the correspondingly temperature-controlled air not only hitting the film surface, but also hitting the cooler clips K and in particular clip parts 6, so that the temperature-controlled air is cooled. This leads to instabilities in the air currents and above all to an uneven temperature distribution and thus uneven heating of the film, and above all results in a disturbance in the temperature distribution at the film edges, since the cold clips cool the ambient air in the region of the edges 5. Air instabilities also occur because, in the same space in which the film F is being moved away, not only does the temperature-controlled air flow in accordance with arrow 141, but it also flows out virtually in the opposite direction in accordance with arrows 143, and then flows to the space between the individual ventilation nozzles 41 to the return suction channels (not shown) above.

Another disadvantage is that, due to the flexibly adjustable film width, the nozzle boxes have to be made substantially wider in order to flow over the entire cross section even with the maximum film width. In the case of smaller film widths, these air jets 145 then hit the cover 35c on the top and the cover 35d on the bottom, are deflected accordingly in the direction of ventilation space BE and influence the temperature and air distribution on film F.

Ventilation Module According to the Invention

In order to prevent these disadvantages, a solution according to the invention is proposed, which is explained schematically using a first embodiment with reference to FIGS. 5a and 5b.

FIGS. 5a and 5b each show two cross-sectional views through an upper ventilation module according to the invention, namely a cross section perpendicular through two parallel transport system channels 35 which are arranged at a lateral distance from one another. The corresponding film F to be passed through the system and stretched runs between them. The cross-sectional view is thus shown transversely and in particular perpendicularly to the two guide and transport rails 15, wherein these rails 15 and the actual transport units 7 are not shown in detail. In this regard, reference is made to the previous explanations and illustrations of known solutions. Only the column-shaped opening 37 in the transport system channel housing 35a and the actual clip parts 6 protruding towards one another via the connecting part designated as bridge B beyond the transport system channels 35 are shown, which in the embodiment shown hold a film F that is clamped in a film plane E.

In this case, only the ventilation and return device is shown in FIG. 5a, that is to say the ventilation module, which is provided above the film plane E, i.e. the film F. As a mirror image of this, a corresponding ventilation and return device is usually additionally provided below the film F.

In the cross-sectional view according to FIG. 5a, the associated transport system channels 35 with the associated movable clips K are set such that they hold, for example, a narrow film F with a relatively small film width at its film edges 5 and lead it through the stretching system in the pulling direction 1.

FIG. 5b shows the corresponding cross-sectional view of FIG. 5a, but in a setting in which the two transport system channels 35 are, for example, adjusted in their maximum and thus most distant position laterally away from one another, correspondingly also the rails 15, which are also adjusted, and the clips are therefore moved further away from one another on the rails 15 in order to capture a much wider film F at its film edges and to pull it off in the pulling direction 1 through the stretching system.

In accordance with these different settings, the ventilation module according to the invention is also set differently, which will be discussed below.

In the view according to FIG. 5a, the upper ventilation module is shown with an upper ventilation nozzle 51, which has a suitable ventilation nozzle supply opening 53, for example on the right in FIG. 5a, so that a correspondingly temperature-controlled or, depending on use, usually cooled air or gas flow, as a rule, ambient air (which, however, also consists of other gases or gaseous media or can be mixed with other gaseous media), can be supplied in accordance with the arrows 55.

In the central region of the ventilation nozzle 51, for example, the corresponding air or gas flow can be blown into a central portion 57 (ventilation or ventilation nozzle chamber 57) which has an outlet opening 59 which is preferably oriented in the direction of film F.

The gas or air flow can then flow out in the direction of the film F via a subsequent ventilation channel or ventilation nozzle channel 61 (which is also sometimes referred to below as a ventilation outlet channel 61) in accordance with the flow arrows 63 there. In other words, the gas or air flow is supplied to the ventilation nozzle or ventilation outlet channel 61 via a gas flow inlet side 61c, wherein the gas flow is then able to continue flowing in the direction of film F at the nozzle outlet opening 62 via the gas flow outlet side 61d thus formed after flowing through the ventilation outlet channel.

In the embodiment shown, the actual nozzle outlet opening 62 lies in the distance range of the clips K, i.e. in the embodiment shown, even at a smaller distance X from the film plane E, which is smaller than a distance XX between the most distant point of the cover 35c and the film plane E. In FIG. 5a, this distance between the film plane E and the portion of the associated cover 35c which is the most distant from the film plane E is designated by XX.

As a result, for example, the temperature-controlled air flows directly onto the film F and thus the film plane E without being cooled by the mass of the clip bodies, if these in particular have a different temperature from the temperature-controlled gas flow supplied to the film.

The gas or air flow supplied to the film can then flow out laterally between two clips which follow one another in the pulling direction, specifically in the direction of the outflow arrows 67.

A corresponding gas flow (heated or unheated and preferably consisting of air) can therefore be supplied to the ventilation module from the so-called air inflow side on one side through the aforementioned ventilation supply opening 53 or on the two opposite sides of the ventilation module (i.e. on both sides), from where the gas or air flow then evenly enters the nozzle chamber 57 mentioned. From there, the gas or air flow can flow uniformly over the entire nozzle width and length, i.e. over the entire available cross section of the so-called outlet openings 59, from the ventilation chamber 57 into the actual ventilation outlet channel 61. The so-called outlet openings 59 thus form the nozzle inlet openings 59 for the ventilation outlet channel 61. The outlet opening 59 of the ventilation chamber 57 is designed, as will be discussed later, in such a way that it has a multiplicity of slots and/or holes. The gas or air flow can then continue to flow to the nozzle outlet opening 62 via the ventilation outlet channel 61 mentioned, in order to exit there in the direction of the film F, namely at the level of the clips K or the clip parts 6. This outflow movement can therefore take place more or less unhindered between the clip bodies in the direction of film F and film plane E. Reflected by the film F, the gas or air flow is then suctioned off between the clips (which are at a certain distance from one another in the direction of movement, i.e. pulling direction) via the film edge in the direction of the return nozzle, which will be discussed later.

In the embodiment shown, a spacing space 43 is again provided between the top or cover side 35c of the transport system channels 35 (i.e. the side which is furthest from the film plane F) and the material web or film side 51a of the ventilation nozzle 51, so that the recirculated gas flow via the flow direction in accordance with the arrow representation 67 is then appropriately moved into the spacing space 43 in order then to be able to flow into corresponding return suction channels 70. These return suction channels 70 are thus traversed by the recirculated air or gas flows and can reach an upper portion of the upper return suction nozzle 71 or chamber in the embodiment shown in FIG. 5a.

From there, the recirculated gas or air stream can be guided further according to the arrows 72, for example, to a heater 73 (if a temperature control, i.e. heating, is provided for the gas stream; otherwise, a cooling device 73 would have to be provided here), in order to then bring the gas or air flow to the appropriate temperature again—which will be discussed later—via appropriate ventilator devices, for example, to again supply the ventilation nozzle feed opening 53, so that the gas flow is then again fed to the ventilation channel 51 in the described direction via the flow direction 55.

A corresponding ventilation nozzle, as stated, is then preferably also arranged mirror-symmetrically corresponding to the height of the film plane E with reference to the transport system channels 35 on the underside of the film F, as is shown schematically with reference to FIG. 5c.

Reference is subsequently made to FIG. 5b, in which it is shown how the transport system channels 35 and thus the associated clips K are set further apart from one another at a lateral distance in order to correspondingly transport and stretch a wider film F if necessary through the stretching system.

The principle according to the invention and the basic structure according to the invention of the ventilation nozzle according to the invention can also be seen from this cross-sectional view according to FIG. 5b.

FIG. 5b shows that the ventilation nozzle with its actual ventilation outlet channel 61 protruding in the direction of film F is divided into at least two parts and has a ventilation channel portion 61a which, for example, relative to the pulling direction 1 or to the material web or plastics film F, the left-hand clips K (or clip part 6) of the left-hand movable clips K with the associated left-hand transport system channel 35. The separate ventilation channel portion 61b is then arranged on the opposite side from the material or film web F, i.e. referring to the cross-sectional view according to FIG. 5b, is arranged on the right side of the material or film web F, and is thereby assigned to the clips K which are on the right or are movable on the right side and the right-hand transport system channel 35. In principle, therefore, ventilation channel spacings 61a and 61b could also be referred to as ventilation channel halves 61a and 61b, which are preferably divided in a plane running perpendicular to the film plane and in the pulling direction 1 and are preferably arranged and/or formed in mirror image.

The two ventilation outlet channel portions 61a, 61b on the side facing away from the film plane E merge into angular portions 64 running parallel to the film plane E, wherein the angular portion 64a associated with the one ventilation outlet nozzle portion 61a and the angular portion 64b associated with the opposite ventilation outlet nozzle portion 61b run away from one another. These angular portions 64a, 64b delimit the supply opening 83 for supplying the gas and air flow from the ventilation chamber 57 to the ventilation outlet nozzle 61 in the lateral direction.

In other words, when the distance between the transport system channels 35 and thus the distance between the two rails 15 running laterally to the film edge and the clips K moved thereon is adjusted, the two ventilation channel portions 61a and 61b are preferably also adjusted to a greater or lesser extent (even if these are separately adjustable), so that the width of the ventilation channel 61 in the transverse direction or in the vertical direction perpendicular to the pulling direction 1 becomes significantly wider. The ventilation channel width B is so large that the corresponding lateral ventilation channel walls 62a and 62b (which are sometimes referred to below as ventilation channel sheets) are set or adjusted with the width adjustment of the transport system channels 35 so that the front end 62c of the ventilation channel walls 62a and 62b pointing in the direction of the film F preferably lies in the same relative position to the clips K or to the clip parts 6, as in the position of the transport system channels 35 with the associated movable clips K set close to one another according to the cross-sectional view in FIG. 5a.

This is because even in the variant according to FIG. 5b, the air or gas stream can now be fed to the film F more or less over the entire width of the film F without being cooled by the clip body, as has been described as disadvantageous with respect to the prior art.

Even with the setting according to FIG. 5b, the air or gas flow supplied to the film F can then again, primarily, flow around between the movable clips according to the arrow representations 67 and 69 via the spacing space 43 and the return suction channel 70 to the return suction nozzle or chamber 71 and from there, if necessary, circulate via a heater 73.

With the arrangement according to the invention, a width adjustment with respect to the film and associated ventilation nozzle can therefore be carried out in one dimension, which was previously not possible in the prior art. Nevertheless, the temperature-controlled gas stream supplied can be fed directly to the film F, since the actual nozzle outlet opening 62 can also be arranged lying directly adjacent to the film plane E, even with the width adjustment according to FIG. 5b.

A cross-sectional view of a comparable embodiment is shown below with reference to FIGS. 6a and 6b, specifically for a narrow distance between the adjacent clips with a small or minimal width FB of the plastics film F and also with a large film width FB, as shown with reference to FIG. 6b.

The essential difference from the previous embodiment is that in the variant according to FIGS. 6a and 6b guide plates or guide walls 77 are also provided which are assigned to the respective transport system channels 35 and thus to the opposite clips K and which ultimately are connected at one end with the associated ventilation channel portions 61a and 61b, preferably in the vicinity or directly at the film-side ventilation channel end or ventilation channel edge 62c.

In the embodiment shown, these guide walls or guide plates 77 diverge from their fastening point 62d, preferably on the respectively opposite outer sides of the ventilation channel portions 61a and 61b, as seen from the film plane E, and then merge into a return channel 79 comprising the spacing space 43, the return channel wall 79a of which facing the film F lies directly or indirectly, for example, on the upper side 35c (top side 35c) of the transport system channel 35 or of the transport system channel housing 35a. As a result, when the system is adjusted to a greater or lesser width setting B of the nozzle outlet opening 62 and thus of the two ventilation channel portions 61a and 61b away from one another or towards one another, an adjustment away from one another or towards one another can preferably be made with the respectively assigned transport system channel 35 in accordance with the arrow representations 39.

So that the returning gas or air flow can flow into the corresponding return paths according to the arrow representations 67, the guide walls or guide plates 77 are also provided with passage openings 81, for example perforated openings or slot openings. In the embodiments according to FIGS. 6a and 6b, these slot or gap openings 81 are provided as longitudinal slots running perpendicular to the plane of the drawing, so that the returned gas flow according to the arrow representations 67' shown from the region below these guide walls or guide plates 77 (in which the movable clips are located K) can flow into the space above the guide plates in the upper ventilation nozzle arrangement shown in FIG.

6b into the return channel. As stated several times, the ventilation nozzle on the underside of the film would preferably be designed accordingly.

In order to spatially represent the actual ventilation nozzle or the ventilation outlet channel 61, for example, in the narrow, collapsed state, reference is also made below to FIG. 7. The passage openings 81 mentioned, here in the form of slot-shaped passage openings 81, are shown in the side air walls or guide plates 77.

A corresponding spatial representation of a complete ventilation nozzle with an upper ventilation nozzle 51 and a corresponding lower ventilation nozzle 51' is now shown on the basis of FIGS. 8a and 8b, specifically in cross section transverse to the film plane E and thereby transverse to the pulling direction 1 of the film F. In this case, FIG. 8a shows an arrangement in which the plastics film has a small width FB, i.e. the corresponding lateral clips K circulating on the rails 15 are moved at a short time interval toward one another.

In the view according to FIG. 8b, the corresponding ventilation nozzle with its upper and lower ventilation nozzles 51 and 51' is brought into a maximum lateral spacing position in order to keep a particularly wide film with a large width FB clamped at the film edge and to move it through the system in the pulling direction.

Accordingly, the two ventilation channel portions 61a and 61b with the associated circumferential clips K, their rails 15 and here the transport system channels 35, including the transport system channel housings 35a, are brought into a maximum width distance position.

It can also be seen from this illustration that the mentioned guide walls or guide plates 77 can have a plurality of passage openings 81, for example arranged one above the other, especially if the passage openings 81 are slot-shaped, i.e. parallel to one another and parallel to the film plane E. Otherwise, however, transverse longitudinal slots or hole openings distributed across an area with a large number of gas passage openings could also be provided for this purpose.

It can also be seen from FIGS. 8a and 8b that the actual gas supply region is from the upper nozzle box 51 into the actual ventilation channel 61 via an open gas passage wall 83 into the actual ventilation channel 61. The gas passage wall 83 comprises an arrangement of one or more outlet openings 59, i.e. with one or more nozzle inlet openings 59 for the ventilation outlet channel 61 via which the gas or air flow can flow from the ventilation chamber 57 into the actual ventilation outlet channel 61. For this purpose, the outlet openings 59 and thus the nozzle outlet opening 59 into the ventilation outlet channel 61 in the gas passage wall 83 in the embodiment shown are designed in the form of a perforated grid, i.e. with a multiplicity of individual holes which are arranged offset with respect to one another in the longitudinal and transverse directions, or with a multiplicity of individual openings, which are introduced in the longitudinal and transverse directions in this gas passage wall 83.

The corresponding air or gas passage openings 59 are arranged distributed in such an region that ensures that the corresponding gas or air flow, even with maximum width distance adjustment of the ventilation channel portions 61a and 61b according to FIG. 8b, can flow as freely as possible through the entire width and length adjustment through this gas passage wall 83 into the actual ventilation channel 61, as is also shown by the arrows 141 arranged next to one another.

From the illustrations according to FIGS. 6a and 6b, but also FIGS. 8a and 8b, it can be seen or at least understood that the two ventilation channel portions 61a and 61b merge into a cover wall or cover plate 91 on their side facing away from the film, which cover plate runs parallel to the film plane E and preferably abuts directly on the underside of the lower wall of the ventilation nozzle or ventilation chamber 51 (based on the upper ventilation nozzle according to FIGS. 6b and 8b). If the entire system is adjusted to a small film width in accordance with FIGS. 6a and 8a, these cover walls or cover plates 91 cover the majority of the perforated gas passage wall 83 as part of the film-side boundary wall 51a, so that a gas can or air flow can only flow into the actual ventilation channel 61 via those passage openings 81 remaining unshielded, which ventilation channel is therefore not closed by the cover walls or cover plates 91 mentioned.

If the entire system is set to a film width FB that is large in comparison, as shown in FIGS. 6b and 8b, not only are the two ventilation channel portions 61a and 61b moved away from one another (with the associated transport system channels 35), but also the associated cover walls or cover plates 91, whereby a larger to maximum region of the gas passage wall 83 is released, that is to say the supplied gas or air flow can flow more or less preferably over the entire width B of the ventilation channel 61 from the upper ventilation chamber 57 or the nozzle box 51 into the ventilation channel 61.

Even if the system is set for the ventilation of a wide plastics film, i.e. with the ventilation channel portions 61a and 61b moved apart, the advantages according to the invention are still realised, since the nozzle outlet opening 62 is still arranged in direct proximity to the film F and to the film plane E, and the corresponding gas or air flow can continue to be fed through the ventilation channel to the film F, more or less past the actual clips K or clip parts 6, without being swirled and without experiencing a change in temperature due to the possibly cold clip bodies located on the outside. The setting in which a narrow plastics film is appropriately temperature-controlled or cooled with the ventilation nozzle, up to a setting such that a comparably very wide plastics film is treated accordingly, can be carried out unhindered over the entire adjustment range.

It can also be seen from this illustration according to FIGS. 8a and 8b that the aforementioned return suction channels 69 can be provided several times, for example, namely in the form of a plurality of tubular channels which are arranged adjacent to one another in the pulling direction 1.

With reference to FIGS. 8a and 8b, it is also indicated that at the end of the upper return suction chamber 69 the already mentioned heating, temperature-control or, if necessary, also a cooling device 73 can be provided, so that the correspondingly recirculated air or gas flow can be suctioned in via a downstream fan 75 and fed back into the inlet opening 53 of the nozzle arrangement via the outlet side of the fan 75.

The invention claimed is:

1. A stretching system for stretching a plastics film with a ventilation module, having the following features:
   two circumferential travel paths or tracks are provided, which are arranged at a lateral distance from one another,
   the travel paths or tracks are formed at least in part by transport and/or guide rails,
   movable clips are movable on these transport and/or guide rails, which movable clips are movable via a transport part on the transport and/or guide rails and thereby comprise a film-side clip part, wherein, relative to a pulling direction of the film through the stretching system, movable clips on the left side grasp the left film edge and movable clips on the opposing right side grasp the right film edge of the film which is movable through the stretching system and convey the film in the film plane defined thereby through the stretching system, an upper and/or a lower ventilation outlet nozzle is provided above the film plane and/or below this film plane, a ventilation outlet channel is separated in the longitudinal direction between its gas flow inlet side and its gas flow outlet side opposite thereto to form at least two ventilation outlet channel portions, such that the at least two ventilation outlet channel portions are adjustable away from or towards one another transverse to the pulling direction of the film and are adjustable parallel to the film plane or at least from or towards one component parallel to the film plane, as a result of which the width of the ventilation outlet channel and thus the flow cross section can be increased or reduced.

2. The stretching system according to claim 1, wherein:
the upper and/or lower ventilation outlet nozzle in each case comprises the at least two-portion ventilation outlet channel, such that the one ventilation outlet channel portion is positioned relative to the movable clips on the left in the pulling direction and is left transport system channel, whereas the opposite second ventilation outlet channel portion is positioned relative to the clips which are movable to the right in relation to the pulling direction of the film and to a transport system channel to the right, and
the two ventilation outlet channel portions are adjustable directly or indirectly towards and away from one another with respect to a ventilation chamber located away from the film, and are movably held via the ventilation chamber and/or the associated transport system channel.

3. The stretching system according to claim 2, wherein the two ventilation outlet channel portions on the side facing away from the film plane merge into angular portions running parallel to the film plane, wherein the angular portion associated with the one ventilation outlet nozzle portion and the angular portion associated with the opposite ventilation outlet nozzle portion facing away from one another, and that these angular portions delimit a supply opening for supplying the gas and air flow from the ventilation chamber to the ventilation outlet nozzle in the lateral direction.

4. The stretching system according to claim 1, wherein
a) the two ventilation outlet channel portions, which are oriented in the direction of the film, are adjustable to the same extent away from or towards one another as the two lateral transport and/or guide rails in the same stretching portion of the stretching system are adjustable away from and towards each other, and/or
b) the ventilation outlet channel portions are adjustable away from or towards each other, together with two lateral transport and/or guide rails and/or together with the two lateral transport system channels, or
c) the width of the ventilation outlet channel is so wide transversely to the pulling direction of the film, or is adjustable so that the width of the ventilation outlet channel corresponds to the minimum distance between two opposite clips or deviates therefrom by less than 30%.

5. The stretching system according to claim 1, wherein the clips are divided into a clip part and a transport part connected thereto via a bridge, wherein the transport part is movable on the transport and/or guide rails, and that between the clip part and the transport part a transport system shielding wall is provided, which has a height, and that the ventilation outlet channel protrudes so far in the direction of the film plane that the ventilation outlet nozzle opening
a) is closer to the film plane than the end of the transport system shielding wall which is at a distance from the film plane, and/or
b) is so close to the film plane that the ventilation outlet nozzle opening is arranged at a smaller distance from the film plane than the distance between a point of a clip part and/or an associated clip lever furthest from the film plane and the film plane.

6. The stretching system according to claim 5, wherein the ventilation outlet channel protruding in the direction of the film with its two ventilation outlet channel portions starts from a ventilation chamber that is further away from the film plane than the distant end of the transport system shielding wall.

7. The stretching system according to claim 5, wherein the transport system shielding wall is part of a transport system channel and/or transport system channel housing.

8. The stretching system according to claim 1, wherein
a) a gas return flow path is provided, which is formed between two clips lying adjacent to each other in the pulling direction and is formed by a spacing space between a transport system channel or transport system channel housing ending at a distance from the film plane, and an even more distant boundary wall of a ventilation chamber, and/or
b) the return flow path for the gas or air flow takes place via return channels to a return chamber, wherein the return channels are formed by channels which run through a ventilation chamber for supplying an air or gas flow.

9. The stretching system according to claim 1, wherein the maximum supply opening between the ventilation chamber and a nozzle inlet opening of the ventilation outlet channel is formed by a perforated and/or slotted grid, which corresponds to that width range or deviates preferably by less than 30%.

10. The stretching system according to claim 1, wherein the two ventilation outlet channel portions are supported on the respective outer sides which are at a distance from one another in each case by at least one guide wall or one guide plate.

11. The stretching system according to claim 10, wherein
a) the guide wall or the guide plate on the respective opposite outer sides of the ventilation outlet nozzle portions diverge away from the film plane and merge into a support portion running parallel to the film plane, which support portion is supported on the end of a transport system channel, a transport system channel housing, or a transport system shielding wall which is remote from the film plane, and/or
b) the guide wall or the guide plate is provided with at least one or a plurality of passage openings, via which a gas or air backflow can flow from the side facing the film through this at least one passage opening on the side remote from the guide wall or guide plate into the return flow channel formed there.

12. The stretching system according to claim 1, wherein one or a plurality of fan arrangements are provided,
a) wherein at least one fan arrangement is provided on the input side of the at least one ventilation chamber or an intermediate chamber arranged upstream thereof, via which the gas or air flow to be supplied via the ventilation chamber is transportable into the ventilation outlet channel, and/or b) wherein at least one fan arrangement is arranged at the outlet end of a gas or air flow return channel, via which the recirculated gas or air flow can be suctioned in and directly or indirectly blown into one of the at least one ventilation chambers on the inlet side, and/or c) wherein a heater is provided in the circulating flow path of the gas or air flow upstream of the suction side of the fan device.

\* \* \* \* \*